Figures 1, 2:
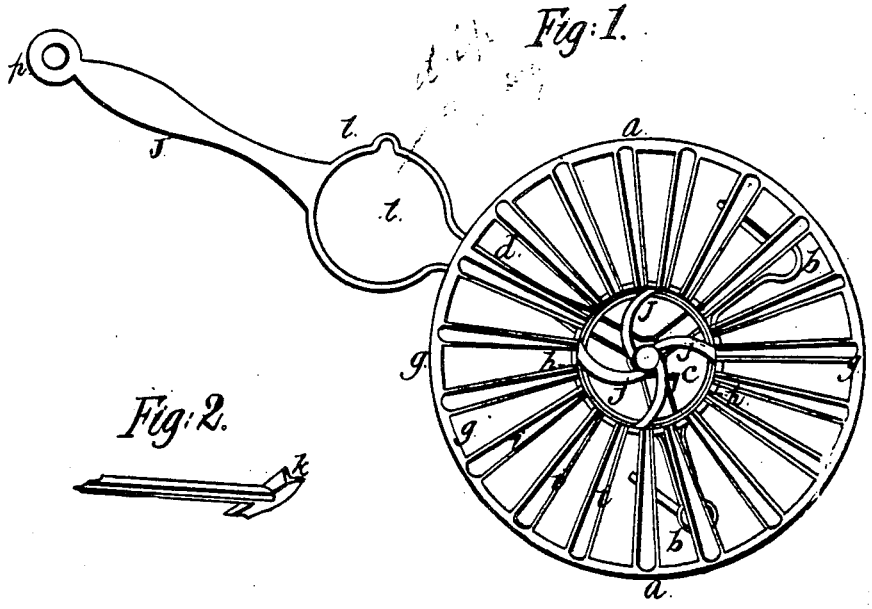

NO PRINTED SPECIFICATION AVAILABLE.

5-62

61×

Bush & Pratt,

Gridiron.

Reissued Sept. 17. 1834

N. PETERS, PHOTO-LITHOGRAPHER, WASHINGTON

United States Patent Office

PTO - BOYERS, PA Duty Station

MISSING PAGE TEMPORARY NOTICE

PATENT # 61X FOR ISSUE DATE 9-17-1834 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

pg. 2 thru end.

Data Conversion Operation

Boyers, Pa